UNITED STATES PATENT OFFICE.

GEORG ORNSTEIN, OF NIAGARA FALLS, NEW YORK, ASSIGNOR TO HOOKER ELECTROCHEMICAL COMPANY, OF NEW YORK, N. Y., A CORPORATION OF NEW YORK.

METHOD OF PURIFYING NON-OXIDIZING ORGANIC ANHYDRIDS.

1,069,168.  Specification of Letters Patent.  Patented Aug. 5, 1913.

No Drawing.  Application filed October 14, 1910.  Serial No. 587,037.

*To all whom it may concern:*

Be it known that I, GEORG ORNSTEIN, a subject of the Emperor of Germany, residing at Niagara Falls, in the county of Niagara and State of New York, have invented certain new and useful Improvements in Methods of Purifying Non-Oxidizing Organic Anhydrids, of which the following is a specification.

This invention relates to the preparation of organic anhydrids of commercial purity, and comprises a method of purifying the crude anhydrid recovered by distillation from the reacting mass.

The method will be described by reference to the purification of the crude acetic anhydrid produced from acetates by reaction in presence of chlorin and sulfur, or their compounds, but it is applicable also to the purification of other organic anhydrids which are non-oxidizing or highly resistant to oxidation, as for instance, propionic anhydrid.

Acetic anhydrid, prepared by reacting upon acetates of sodium, calcium or the like, or mixtures of these, with such reagents as sulfuryl chlorid, chlorid of sulfur, or mixtures of sulfur dioxid and chlorin, is usually contaminated by sulfur chlorid and other impurities, the proportion of which may vary somewhat according to the conditions of preparation, the impurities being however always present to an objectionable degree. Even when an excess of the acetate is present in the reacting mixture the distillate is found to contain small proportions of dichlorid of sulfur, the presence of which in the technical product is highly objectionable. Owing to the fact that the boiling points of acetic anhydrid and sulfur dichlorid are substantially identical, re-distillation or fractionating is quite ineffectual for the further purification of the product.

I have discovered that the acetic anhydrid prepared as above may be quickly and effectively purified to a degree sufficient for most technical purposes by treatment with suitable oxidizing agents, whereby the sulfur compounds are oxidized without loss of anhydrid. The oxidation of the sulfur gives rise to some sulfuric acid in the product, but this is not an objectionable impurity for such technical uses of the anhydrid as the preparation of cellulose esters, inasmuch as the cellulose is usually hydrolyzed in presence of sulfuric acid as a step preliminary to the manufacture of cellulose acetate. Furthermore, in case it is desired to prepare a product free from sulfuric acid, this is most easily accomplished by a second distillation.

Example: To the crude dark colored acetic anhydrid prepared, for instance, by reacting with sulfur dichlorid upon sodium acetate and distilling the product, there is added from one-fourth to one per cent. by weight of fuming nitric acid, according to the proportion of sulfur present. The liquid is then heated to the boiling point under a reflux condenser, and continues to boil for some minutes owing to the reaction heat, red fumes being evolved. The product will be found to be nearly colorless, or to have a yellow tint, and will give only a faint reaction for sulfur with silver nitrate. Ozone acts in a similar manner, the ozonized air being passed through the cold anhydrid for one hour or less or until ozone can be detected in the escaping gases by starch-iodin paper. The quantity of sulfur remaining may be readily determined by dissolving a sample of the anhydrid in ammonia and adding silver nitrate, whereby the silver is precipitated as sulfid. The oxidation of the sulfur by the ozone is less complete than with nitric acid, and the decolorization of the liquid is somewhat less pronounced.

Other oxidizing agents, as chromic acid, potassium permanganate, etc., are effective as regards the elimination of sulfur chlorid, but in most cases a second distillation is required to obtain a colorless or light colored product. The particular advantage of nitric acid, preferably employed as the fuming acid, is that it is not only very effective in oxidizing the sulfur, but also yields directly and without further distillation a product which fulfils in all respects the technical requirements as to color and purity.

I claim:

1. The method of treating such organic anhydrids as are themselves resistant to oxidation but contain oxidizable impurities, which comprises acting thereon with a suitable oxidizing agent under conditions to oxidize the impurities contained therein.

2. The method of treating such organic anhydrids as are themselves resistant to oxidation but contain oxidizable impurities, which comprises acting thereon with fuming nitric acid under conditions to oxidize the impurities contained therein.

3. The method of treating such organic anhydrids as are themselves resistant to oxidation but contain oxidizable impurities, which comprises acting thereon with a suitable oxidizing agent under conditions to oxidize the impurities contained therein, and distilling the product.

4. The method of treating acetic anhydrid containing oxidizable impurities, which comprises acting thereon with a suitable oxidizing agent under conditions to oxidize the impurities contained therein.

5. The method of treating acetic anhydrid containing oxidizable impurities, which comprises acting thereon with fuming nitric acid under conditions to oxidize the impurities contained therein.

6. The method of treating acetic anhydrid containing oxidizable impurities, which comprises acting thereon with a suitable oxidizing agent under conditions to oxidize the impurities contained therein, and distilling the product.

In testimony whereof, I affix my signature in presence of two witnesses.

GEORG ORNSTEIN.

Witnesses:
   EDW. E. FRAUCHOT,
   FREDERICK CHORMANN.